United States Patent
Velthaus et al.

(10) Patent No.: US 11,628,717 B2
(45) Date of Patent: Apr. 18, 2023

(54) HYBRID DRIVE TRAIN

(71) Applicant: DAIMLER AG, Stuttgart (DE)

(72) Inventors: Jan Velthaus, Stuttgart (DE); Kai Heukelbach, Köngen (DE); Thomas Lechthaler, Stuttgart (DE); Lukas Rube, Plüderhausen (DE); Bernhard Ziegler, Rechberghausen (DE); Bernd Koppitz, Winterbach (DE); Axel Lange, Krostitz (DE); Alexander Baier, Holzgerlingen (DE); Daniel Hopp, Holzgerlingen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 90 days.

(21) Appl. No.: 17/440,256

(22) PCT Filed: Feb. 24, 2020

(86) PCT No.: PCT/EP2020/054723
§ 371 (c)(1),
(2) Date: Sep. 17, 2021

(87) PCT Pub. No.: WO2020/187529
PCT Pub. Date: Sep. 24, 2020

(65) Prior Publication Data
US 2022/0153121 A1    May 19, 2022

(30) Foreign Application Priority Data
Mar. 20, 2019  (DE) .................. 10 2019 001 937.7

(51) Int. Cl.
*B60K 6/387* (2007.10)
*B60K 6/48* (2007.10)
*B60K 6/405* (2007.10)

(52) U.S. Cl.
CPC ............. *B60K 6/48* (2013.01); *B60K 6/387* (2013.01); *B60K 6/405* (2013.01); *B60K 2006/4825* (2013.01)

(58) Field of Classification Search
CPC ............ B60K 6/48; B60K 6/387; F16H 45/02
See application file for complete search history.

(56) References Cited

U.S. PATENT DOCUMENTS

2002/0066607 A1   6/2002  Levin
2011/0240431 A1 * 10/2011  Iwase .................. B60L 50/16
                                                    192/3.29
(Continued)

FOREIGN PATENT DOCUMENTS

CN   101789658 A  *  7/2010
CN   212210629 U  * 12/2020
(Continued)

OTHER PUBLICATIONS

International Search Report dated May 26, 2020 in related/corresponding International Application No. PCT/EP2020/054723.
(Continued)

*Primary Examiner* — Stacey A Fluhart
(74) *Attorney, Agent, or Firm* — Patent Portfolio Builders PLLC

(57) ABSTRACT

A hybrid drive train for a motor vehicle having an internal combustion engine, an electric machine, a first clutch, which is provided for coupling a crankshaft of the internal combustion engine to the rotor, and a second further clutch, which is designed as a wet clutch and which has a clutch cover. A screw connection is provided for non-rotatably connecting the rotor to the clutch cover, which screw connection includes a screw, which is substantially arranged in an axial direction and which at least partially penetrates a connecting piece non-rotatably fastened to the clutch cover.

9 Claims, 1 Drawing Sheet

(56) References Cited

U.S. PATENT DOCUMENTS

| | | | | |
|---|---|---|---|---|
| 2016/0109010 A1* | 4/2016 | Lindemann | ............ | F16H 41/28 |
| | | | | 192/3.21 |
| 2018/0062469 A1* | 3/2018 | Satyaseelan | ............ | H02K 1/28 |
| 2018/0313409 A1 | 11/2018 | Iizuka | | |
| 2021/0086605 A1 | 3/2021 | Laigo et al. | | |
| 2021/0328479 A1* | 10/2021 | Großpietsch | ............ | H02K 1/30 |

FOREIGN PATENT DOCUMENTS

| | | | | |
|---|---|---|---|---|
| CN | 213082904 U | * | 4/2021 | ............ B60K 6/387 |
| DE | 102005053887 A1 | | 5/2007 | |
| DE | 102015007138 A1 | | 1/2016 | |
| DE | 19964504 B4 | | 2/2016 | |
| DE | 102018116589 A1 | | 1/2019 | |
| DE | 102017129873 A1 | | 2/2019 | |

OTHER PUBLICATIONS

Search Report dated Nov. 12, 2019 in related/corresponding DE Application No. 10 2019 001 937.7.
Written Opinion dated May 26, 2020 in related/corresponding International Application No. PCT/EP2020/054723.

* cited by examiner

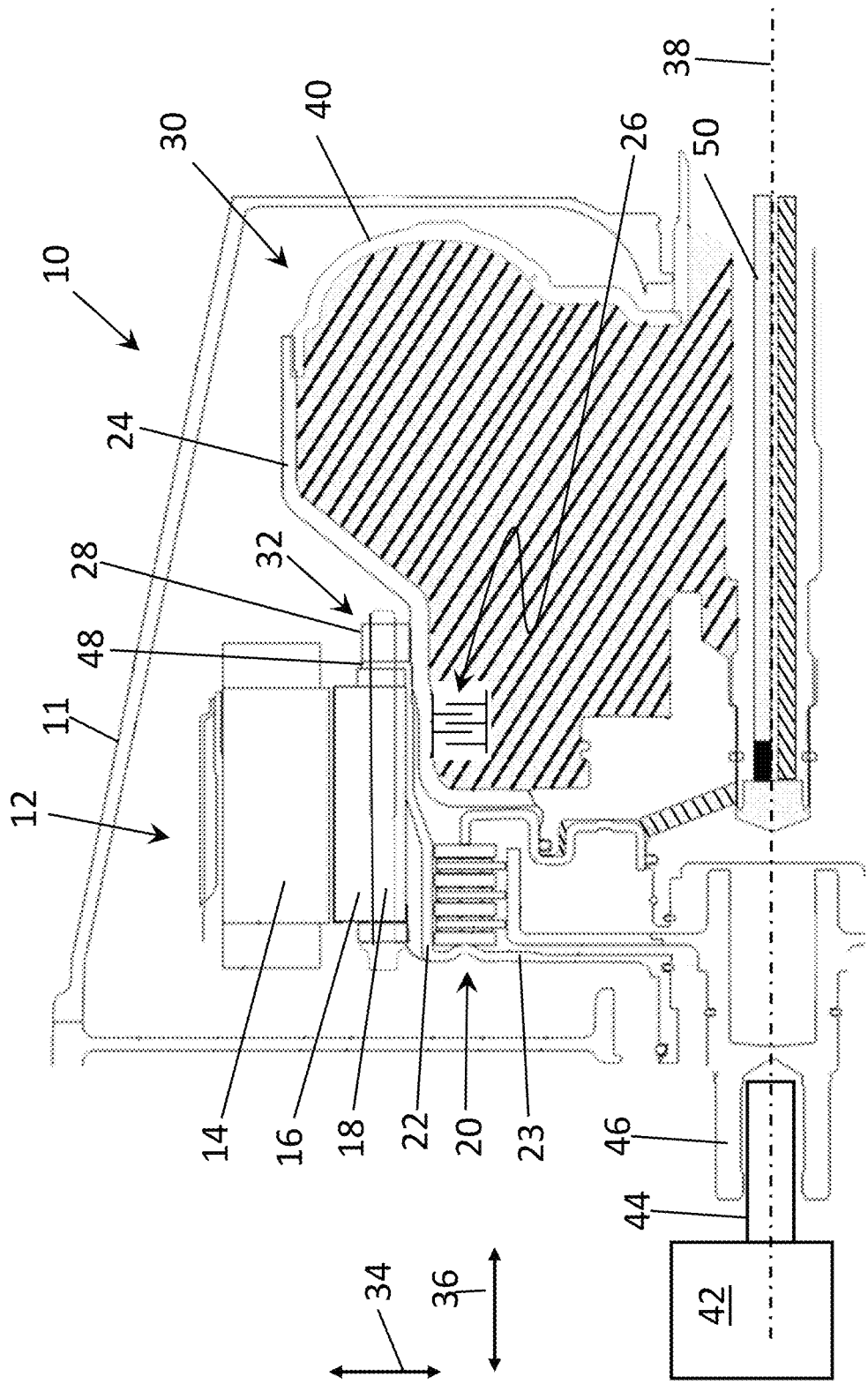

HYBRID DRIVE TRAIN

BACKGROUND AND SUMMARY OF THE INVENTION

Exemplary embodiments of the invention relate to a hybrid drive train.

Such a hybrid drive train is already known from the general prior art, for example from DE 10 2015 007 138 A1, which shows a rotor of an electric machine attached to a coupling housing by means of a screw.

Furthermore, DE 10 2005 053 887 A1 discloses a hybrid drive train for a motor vehicle having an internal combustion engine, an electric machine which has a stator and a rotor, at least a first clutch and a further clutch which is a wet clutch and which comprises a clutch cover. An outer lamella carrier of the first clutch is non-rotatably connected to a rotor support of the rotor of the electric machine, wherein the rotor support is arranged, at least in regions, in a radial direction, between the rotor and the clutch cover, wherein the clutch cover and the rotor are arranged coaxially with respect to each other, and the clutch cover can be non-rotatably connected to the rotor by means of a screw connection.

Finally, the generic DE 10 2017 129 873 A1 discloses a hybrid drive train in which, moreover, the screw connection comprises a screw arranged substantially in an axial direction and which at least partially penetrates a connecting piece non-rotatably fixed on the clutch cover.

Exemplary embodiments of the present invention are directed to a hybrid drive train which is as compact, inexpensive, and easy to assemble as possible.

A hybrid drive train for a motor vehicle is assumed, which has an internal combustion engine, an electric machine, which in turn has a stator and a rotor, a first clutch, which is provided for coupling the internal combustion engine to the rotor, and a further clutch, which is designed as a wet clutch, and which in turn comprises a clutch cover.

A lamella carrier of the first clutch is non-rotatably connected to a rotor support of the rotor of the electric machine.

Furthermore, the rotor support is arranged at least in regions in a radial direction between the rotor and the clutch cover. The clutch cover and the rotor are arranged coaxially with respect to each other, and the clutch cover is non-rotatably connected to the rotor by means of a screw connection.

In order to develop the hybrid drive train in such a way that the costs can be kept particularly low, the mountability can be improved and the functionality can be maintained, it is further assumed that the screw connection, by means of which the rotor and the clutch cover are non-rotatably connected to each other, comprises a screw arranged substantially in an axial direction and which at least partially penetrates a connecting piece non-rotatably fixed on the clutch cover.

According to the invention, it is provided that the screw penetrates the rotor, advantageously the stack of metal sheets of the rotor, in the axial direction.

Advantageously, the rotor and the clutch cover are also firmly axially connected to each other by means of the screw connection.

Such a connecting piece is to be understood to mean a metal attachment welded to the clutch cover at a suitable point. By using such a connecting piece, an easier assembly can be implemented. Additionally, a very compact production of the hybrid drive train can be implemented.

The rotor of the electric machine is to be understood, for example, as a rotating body composed of stacks of metal sheets and at least one permanent magnet. The rotor is rotatably mounted relative to the stator of the electric machine and arranged coaxially thereto.

The rotor support is to be understood as a component formed separately from the rotor, which is non-rotatably connected to the rotor, and which is provided to support the rotor at least radially with respect to its rotatable mounting.

Advantageously, the rotor of the electric machine is designed as a so-called internal rotor. This means that the rotor is advantageously arranged radially inside the stator.

A clutch is to be understood as a coupling device provided for non-rotatably connecting two rotatably mounted elements to each other and also for releasing this connection again as required.

A clutch cover is to be understood as a component non-rotatably connected to one of the two rotatably mounted elements of the clutch and which substantially forms a radially outer closure of the clutch.

A non-rotatable connection of two rotatably mounted elements is to be understood to mean that the two elements are arranged coaxially with respect to each other and are connected to each other in such a way that they rotate with the same angular velocity.

The term non-rotatable fastening means, for example, a fastening in the form of welding, screwing, or riveting.

An arrangement in regions of the rotor support radially between the rotor and the clutch cover means that at least a partial section of the rotor support extending in the axial direction is arranged radially between the rotor and the clutch cover.

In the context of the invention, the axial direction means a direction parallel to an axis of rotation of the electric machine or of the rotor of the electric machine.

Advantageously, the rotor, the first clutch, and the further clutch are arranged coaxially to one another.

Advantageously, the rotor and a crankshaft of the internal combustion engine are also arranged coaxially to each other.

A coaxial arrangement of two elements means that the two elements have the same axes of rotation and/or the same rotationally symmetrical axes.

The further clutch advantageously means a clutch by means of which the rotor can be non-rotatably coupled to an input shaft of a transmission. The further clutch can, for example, be formed as a torque converter or, particularly advantageously, as a converter lock-up clutch for a torque converter. However, the further clutch can also be designed as a wet starting clutch.

An advantageous development of the invention provides that the connecting piece has a metal ring. Advantageously, the metal ring is arranged coaxially to the axis of rotation of the electric machine or coaxially to an axis of rotation of the first coupling. Advantageously, the clutch cover itself is rotatable around the axis of rotation of the electric machine and arranged coaxially to the metal ring. The design of the connecting piece as a metal ring results in inexpensive manufacturability.

Advantageously, the screw connection has multiple screws that are either connected to multiple connecting pieces or to the connecting piece designed as a metal ring at several points.

Advantageously, the screw is arranged in parallel to the axis of rotation of the rotor and connects the rotor and the clutch cover. This type of arrangement makes it easy to assemble the hybrid drive train easily.

Advantageously, the screw penetrates the rotor support in the axial direction. For this purpose, the rotor support advantageously has an annular segment arranged coaxially to the axis of rotation and which extends in the radial direction and has at least one bore in the axial direction. Advantageously, the screw is arranged inside the bore.

By means of the screw connection, the rotor, the rotor support, the connecting piece, and the clutch cover are advantageously connected to one another non-rotatably and advantageously also in an axially fixed manner.

A further development of the invention provides that the connecting piece is arranged radially surrounding and at least partially axially overlapping the further clutch. In this way, a very compact hybrid drive train can be represented.

Another development provides that the rotor is arranged radially surrounding and at least partially axially overlapping the first clutch, which also leads to a particularly compact structure.

Advantageously, the rotor is arranged radially surrounding and at least partially axially overlapping the further clutch, which further increases the compactness.

Further advantageous developments arise from the drawing.

BRIEF DESCRIPTION OF THE DRAWING FIGURE

In the following, the invention is described by way of example with reference to the accompanying drawing, which shows, in a partially schematized axial sectional view, a hybrid drive train according to embodiments of the invention.

DETAILED DESCRIPTION

The single FIGURE shows, in a partially schematized axial sectional view, a hybrid drive train (10), which has an electric machine (12), which comprises a rotor (16) and a stator (14).

The rotor (16) is connected to a clutch cover (24) by means of a screw connection (32). Advantageously, the rotor (16), in particular a stack of metal sheets of the rotor (16) (not depicted in more detail) is penetrated in an axial direction (36) by a screw (18) of the screw connection (32).

For connecting to the screw (18), the clutch cover (24) is connected to a connecting piece (28) in a non-rotatable and axially fixed manner.

Advantageously, the screw (18) also penetrates a rotor support (23). In the advantageous exemplary embodiment, the rotor support (23) is mounted radially with respect to an input shaft (46) of the hybrid drive train (10). The rotor support (23) has an approximately cylindrical shape in an extension region of the rotor (16) in the axial direction (36). On a side of the rotor facing the connecting piece (28), the rotor support (23) has an annular segment (48) arranged coaxially with respect to an axis of rotation (38) of the rotor (16) and which extends in a radial direction (34) and has at least one bore (not described in more detail in the drawing) in the axial direction, within which the screw (18) is arranged. The bore in the annular segment (48) is aligned with a further bore (also without a reference numeral in the drawing) in the connecting piece (28). The screw (18) is also arranged within the further bore.

By means of the screw connection (32), the rotor (16), the rotor support (23), the connecting piece (28), and the clutch cover (24) are connected to one another in a non-rotatable and advantageously also axially fixed manner.

The rotor support (23) is non-rotatably connected to an outer lamella carrier (22) of a first clutch (20). The rotor support (23) is particularly advantageously formed in one piece with the outer lamella carrier (22) of the first clutch (20), i.e., the rotor support (23) is also the outer lamella carrier (22). The first clutch (20) can advantageously be designed as a dry lamella clutch.

The first clutch (20) is provided to non-rotatably connect a crankshaft (44) of an internal combustion engine (42) to the rotor (16) and also to disconnect this connection again as required.

The hybrid drive train (20) also comprises a further clutch (26), preferably designed as a wet clutch, which has an input side, preferably designed as a lamella carrier, which is non-rotatably connected to the clutch cover (24). Particularly preferably, the clutch cover (24) and an inner lamella carrier of the further clutch (26) are non-rotatably connected to each other. The input side is thus preferably designed as an inner lamella carrier. The coupling cover (24) is mounted coaxially with respect to the rotor (16).

The rotor (16) is designed as an internal rotor and is arranged radially inside the stator (14).

The rotor support (23) is arranged radially inside the rotor (16). The clutch cover (24) is arranged radially inside the rotor support (23)—in certain regions.

The further clutch (26) is preferably designed as a converter lock-up clutch. Preferably, the clutch cover (24) is non-rotatably connected to a pump wheel (40) of a torque converter (30).

Preferably, the connecting piece (28) is arranged between the rotor (16) and the torque converter (30) as seen in the axial direction (36).

Preferably, the first clutch (20) is arranged radially inside the rotor (16) and axially overlapping the rotor (16).

Preferably, the further clutch (26) is arranged radially inside the rotor (16) and axially overlapping the rotor (16).

Preferably, viewed in the axial direction (36), the internal combustion engine (42), the first clutch (20), the further clutch (26), and the torque converter (30) are arranged one after the other in the order mentioned. Preferably, the first clutch (20) and the further clutch (26) are arranged at least partially overlapping as seen in a radial direction (34). Particularly preferably, the first clutch (20) and the further clutch (26) have substantially the same outer diameter.

An output side of the torque converter (30) (not depicted in more detail) and a further output side of the further clutch (26) (not depicted) are each non-rotatably connected to an input shaft (50) of a transmission (not further depicted). The further output side of the further clutch (26) is advantageously designed as an outer lamella carrier.

The electric machine (12), the clutches (20, 26), and the torque converter (30) are surrounded by a housing (11), which is advantageously formed separately from a crankcase (not depicted) of the internal combustion engine (42) and separately from a transmission housing of the transmission (not depicted).

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

REFERENCE NUMERAL LIST

10 hybrid drive train
11 housing cover
12 electric machine
14 stator
16 rotor
18 screw
20 first clutch
22 outer lamella carrier
23 rotor support
24 clutch cover
26 further clutch
28 connecting piece
30 torque converter
32 screw connection
34 radial direction
36 axial direction
38 axis of rotation
40 pump wheel
42 internal combustion engine
44 crankshaft
46 input shaft

The invention claimed is:

1. A hybrid drive train for a motor vehicle, the hybrid drive train comprising:
   an internal combustion engine;
   an electric machine having a stator and a rotor;
   a first clutch, which configured to couple a crankshaft of the internal combustion engine to the rotor;
   a further clutch, wherein the further clutch is a wet clutch, is a converter lock-up clutch, and comprises a clutch cover,
   wherein a lamella carrier of the first clutch is non-rotatably connected to a rotor support of the rotor of the electric machine,
   wherein the rotor support is non-rotatably connected to the rotor and at least partially arranged, in a radial direction, between the rotor and the clutch cover,
   wherein the clutch cover and the rotor are arranged coaxially with respect to each other, and the clutch cover is non-rotatably connected to the rotor by
   a screw, which is arranged in parallel to an axis of rotation of the rotor and which at least partially penetrates a connecting piece non-rotatably fastened to the clutch cover,
   wherein the screw penetrates the rotor in the axial direction.

2. The hybrid drive train of claim 1, wherein the connecting piece has a metal ring.

3. The hybrid drive train of claim 1, wherein the screw penetrates the rotor support in the axial direction.

4. The hybrid drive train of claim 1, wherein the connecting piece is arranged radially surrounding and at least partially axially overlapping the further clutch.

5. The hybrid drive train of claim 1, wherein the rotor is arranged radially surrounding and at least partially axially overlapping the first clutch.

6. The hybrid drive train of claim 1, further comprising:
   a torque converter, wherein a pump wheel of the torque converter is non-rotatably connected to the clutch cover.

7. The hybrid drive train of claim 6, wherein the connecting piece is arranged, as seen in the axial direction, between the rotor and the torque converter.

8. The hybrid drive train of claim 1, wherein the clutch cover is non-rotatably connected to a lamella carrier of the further clutch.

9. The hybrid drive train of claim 1, wherein the lamella carrier of the first clutch is an outer lamella carrier of the first clutch and is in one piece with the rotor support of the rotor of the electric machine.

* * * * *